Patented Oct. 30, 1934

1,978,824

UNITED STATES PATENT OFFICE 1,978,824

PRODUCTION OF KETONES

Lloyd C. Swallen, Terre Haute, Ind., assignor to Commercial Solvents Corporation, Terre Haute, Ind., a corporation of Maryland No Drawing. Application April 7, 1934, Serial No. 719,588

15 Claims. (Cl. 260—134)

My invention relates to a process for obtaining ketones from alcohols. More specifically, my invention relates to a process for obtaining ketones by the direct catalytic conversion of aliphatic alcohols using a particular type of catalyst to be described herein.

It is known that ketones may be prepared by the reaction of aliphatic alcohols with water vapor in the presence of heavy metal oxide catalysts. For example, Roka, U. S. P. 1,663,350, discloses this reaction utilizing oxides of metals of the sixth to eighth groups of the periodic system, preferably activated by alkaline earth compounds. These catalysts, however, have certain disadvantages, particularly in the somewhat low yields and conversions obtained by their use.

I have now found that very satisfactory yields and conversions may be obtained by the use of catalysts initially comprising a mixture of easily reducible and difficultly reducible metal oxides and a metal halide. These materials also have the distinct advantage of long catalyst life. Catalysts of this character are disclosed in United States Patents Nos. 1,625,924, 1,625,925, 1,625,927, 1,625,928 and 1,625,929, issued April 26, 1927, for use in the production of synthetic methanol. In their preferred form, these catalysts contain a mixture of oxides including zinc oxide and chromium oxide, together with a metallic halide such as zinc chloride.

The following examples will illustrate catalysts of this type and methods for their preparation:

Example I 160 grams chromium nitrate ($Cr(NO_3)_2.9H_2O$) are dissolved, with heating, in 60 c. c. water. After the solution has cooled, 10 grams zinc chloride and 96 grams ferric nitrate are added. To the resulting cold solution 100 grams zinc oxide are then added with constant stirring. The resulting wet mass is heated in a porcelain evaporating dish to dryness and then placed in a copper crucible in which it is heated over a Fletcher burner to drive off the nitrogen peroxide fumes. The material thus obtained is crushed sufficiently to pass a 65 mesh screen and to it 8.2 grams zinc chloride dissolved in 60 c. c. water are added. The product thus obtained hardens spontaneously.

Example II 2250 grams of cobalt nitrate ($Co(NO_3)_2.6H_2O$) are dissolved in 250 liters of water and the solution is heated to 95° C. There is then added 7.5 kilograms of zinc oxide after which the solution is vigorously stirred and sufficient ammonium hydroxide is added to precipitate the cobalt as cobalt hydrate. The precipitated mass is recovered by decantation and filtration, is washed, dried and broken up into granules. The granules are then moistened with a solution containing 1480 grams zinc chloride and dried once more.

Example III 2600 grams zinc oxide in powdered form are mixed by thorough sifting with 500 grams of black copper oxide. The resultant mixture is moistened with an aqueous solution containing 150 grams cuprous chloride and 200 grams of dextrin. The resultant mass is dried and broken up into pieces whereupon it is ready for use.

Example IV 3500 grams of ferric nitrate are dissolved in 50 liters of water and sufficient ammonium hydroxide is added to precipitate all of the iron as ferric hydroxide. The fluocculent mass is filtered and washed and to it is added 9 kilograms of zinc oxide and the mixture thoroughly stirred. The resultant pasty mass is allowed to dry and is then broken up into granules. To these granules is added a solution containing 1500 grams ferric chloride. The mass is again dried, whereupon it is ready for use.

When employing catalysts of the type illustrated above, the reaction may be carried out in the presence of water vapor as described in U. S. Patent No. 1,663,350, previously referred to, or in the presence of inert dileunts as described in copending applications Serial Number 364,318 by G. Bloomfield, L. C. Swallen and F. M. Crawford, filed May 18, 1929, and Serial Number 429,811 by G. Bloomfield, L. C. Swallen and F. M. Crawford, filed February 19, 1930. Likewise, the reaction may be carried out without any diluent material, but in such cases it is preferred to use reduced pressure as disclosed in the copending applications just referred to. Anhydrous alcohols may be employed, but an aqueous solution is more desirable from an economic standpoint.

The operation of my invention may be illustrated by the following example: The catalyst of Example I is placed in an iron tube, or a catalyst chamber of other suitable material which is capable of withstanding elevated temperatures and which at the same time has no deleterious effect upon either the reactants or the products formed. The catalyst is heated to a temperature of approximately 400° C. and a mixture of 10% aqueous solution of ethyl alcohol passed directly over it, or, preferably, through a preheater and then over the heated catalyst. The escaping gases are passed through suitably arranged condensers and/or scrubbers. The yield, calculated on the amount of ethyl alcohol passed over the catalyst, amounts to 88% of the theoretical.

The procedure of the above specific example may be varied in a number of ways without departing from the scope of my invention. For example, varying proportions of alcohol and water may be employed so long as the mixture contains at least ½ mol of water per mol of alcohol. If more convenient, steam and pure alcohol vapors may be mixed in suitable proportions and passed over the catalyst.

The temperature at which the reaction may be carried out may be varied over a considerable range, i. e. from about 250° C. to about 650° C. It is preferred, however, to employ temperatures ranging from about 400° C. to about 500° C. The exact temperature may be chosen by one skilled in the art in accordance with other factors, such as the volume of catalyst employed, rate of flow of the alcohol-water vapor mixture, pressure utilized, method of attaining the desired pressure, etc.

The reaction, as described above, is applicable to the production of simple or mixed ketones from aliphatic alcohols containing more than one carbon atom. For example, acetone may be prepared from ethyl alcohol or isopropyl alcohol; diethyl ketone from normal propyl alcohol; dipropyl ketone from normal butyl alcohol; a mixture of diethyl, dipropyl, and ethyl propyl ketones from normal propyl and normal butyl alcohols; and corresponding ketones from other alcohols of this series such as secondary butyl, amyl, and the like.

The table given below shows experimental results obtained with different alcohols under different operating conditions using the catalyst of Example I.

*Table*

| Alcohol | Alcohol rate * | Temp. ° C. | Conversion to ketone (percent) |
|---|---|---|---|
| Ethyl | 0.09 | 400 | 82.0 |
| Do | 0.18 | 400 | 61.0 |
| Do | 0.15 | 460 | 88.0 |
| Do | 0.20 | 400 | 89.0 |
| Do | 0.17 | 460 | 74.0 |
| Do | 0.22 | 460 | 91.0 |
| Isopropyl | 0.10 | 450 | ** 60.0 |
| Butyl | 0.05 | 400 | 65.0 |

* Alcohol rate reported in c. c. liquid alcohol (measured at room temperature) per c. c. catalyst per hour.
** Conversion calculated on basis of one mol of alcohol yielding one mol of ketone; in all other cases conversion calculated on basis of two mols of alcohol yielding one mol of ketone.

It is apparent from the results shown in the above table that the catalysts of the present invention give satisfactory conversions under a wide variety of operating conditions. It is also seen that these catalysts are equally applicable to the production of acetone and the production of higher ketones.

Although the catalysts for use in the present invention have quite satisfactory life in continuous operation, they will usually require reactivation at intervals. This may readily be accomplished by passing oxygen or an oxygen-containing gas such as air, over the catalyst mass for a number of hours at temperatures from about 450° C. to about 600° C. One skilled in the art will recognize, from the lowered rate of conversion, the time when such reactivation is necessary.

It is to be understood, of course, that the examples of catalysts and the examples of specific reaction conditions given above, by way of illustration, are not to be taken as limiting the scope of my invention. Catalysts other than those specifically disclosed may be employed as long as they comprise, essentially, a mixture of easily reducible and difficultly reducible oxides in combination with a metal halide. Ketones or mixtures of ketones other than those specifically mentioned above may be prepared from other alcohols of the aliphatic series. All alcohols of this series which contain more than one carbon atom, and which are volatile and do not decompose under the reaction conditions, are suitable for use in my invention. In general it may be said that the use of any equivalents or of any modifications of procedure which would naturally occur to one skilled in the art may be employed without departing from the scope of my invention.

The present application is a continuation-in-part of U. S. Serial Number 364,318, filed May 18, 1929 and U. S. Serial Number 429,811, filed February 19, 1930, in the names of G. Bloomfield, L. C. Swallen and F. M. Crawford.

My invention now having been described, what is claimed is:

1. In a catalytic process for the production of ketones from gas mixtures containing as a major component vapors of alcohols containing more than one carbon atom, the improvement which comprises subjecting the gaseous reactant mixture to the action of a catalyst essentially comprising, initially, a mixture of easily-reducible and difficultly-reducible metal oxides and a metal halide.

2. In a catalytic process for the production of ketones from gas mixtures containing as a major component vapors of alcohols containing more than one carbon atom, the improvement which comprises subjecting the gaseous reactant mixture, at temperatures from 250° C. to 650° C., to the action of a catalyst essentially comprising, initially, a mixture of easily-reducible and difficultly-reducible metal oxides and a metal halide.

3. In a catalytic process for the production of ketones from gas mixtures containing as a major component vapors of alcohols containing more than one carbon atom, the improvement which comprises subjecting the gaseous reactant mixture to the action of a catalyst essentially comprising, initially, a mixture of chromium oxide, iron oxide, zinc oxide, and zinc chloride.

4. In a catalytic process for the production of ketones from gas mixtures containing as a major component vapors of alcohols containing more than one carbon atom, the improvement which comprises subjecting the gaseous reactant mixture, at temperatures from 250° C. to 650° C., to the action of a catalyst essentially comprising, initially, a mixture of chromium oxide, iron oxide, zinc oxide, and zinc chloride.

5. In a catalytic process for the production of acetone from gas mixtures containing ethyl alcohol vapor as a major component, the improvement which comprises subjecting the gaseous reactant mixture to the action of a catalyst essentially comprising, initially, a mixture of easily-reducible and difficultly-reducible metal oxides and a metal halide.

6. In a catalytic process for the production of acetone from gas mixtures containing ethyl alcohol vapor as a major component, the improvement which comprises subjecting the gaseous reactant mixture, at temperatures from 250° C. to 650° C., to the action of a catalyst essentially comprising, initially, a mixture of easily-reducible and difficultly-reducible metal oxides and a metal halide.

7. In a catalytic process for the production of acetone from gas mixtures containing ethyl alcohol vapor as a major component, the improvement which comprises subjecting the gaseous reactant mixture to the action of a catalyst essentially comprising, initially, a mixture of chromium oxide, iron oxide, zinc oxide, and zinc chloride.

8. In a catalytic process for the production of acetone from gas mixtures containing ethyl alcohol vapor as a major component, the improvement which comprises subjecting the gaseous reactant mixture, at temperatures from 250° C. to 650° C., to the action of a catalyst essentially comprising, initially, a mixture of chromium oxide, iron oxide, zinc oxide, and zinc chloride.

9. In a catalytic process for the production of ketones from gas mixtures containing as a major component vapors of alcohols containing more than two carbon atoms, the improvement which comprises subjecting the gaseous reactant mixture to the action of a catalyst essentially comprising, initially, a mixture of easily-reducible and difficultly-reducible metal oxides and a metal halide.

10. In a catalytic process for the production of ketones from gas mixtures containing as a major component vapors of alcohols containing more than two carbon atoms, the improvement which comprises subjecting the gaseous reactant mixture, at temperatures from 250° C. to 650° C., to the action of a catalyst essentially comprising, initially, a mixture of easily-reducible and difficultly-reducible metal oxides and a metal halide.

11. In a catalytic process for the production of ketones from gas mixtures containing as a major component vapors of alcohols containing more than two carbon atoms, the improvement which comprises subjecting the gaseous reactant mixture to the action of a catalyst essentially comprising, initially, a mixture of chromium oxide, iron oxide, zinc oxide, and zinc chloride.

12. In a catalytic process for the production of ketones from gas mixtures containing as a major component vapors of alcohols containing more than two carbon atoms, the improvement which comprises subjecting the gaseous reactant mixture, at temperatures from 250° C. to 650° C., to the action of a catalyst essentially comprising, initially, a mixture of chromium oxide, iron oxide, zinc oxide, and zinc chloride.

13. In a process for the production of ketones, the improvement which comprises subjecting a mixture of water vapor and the vapors of alcohols containing more than one carbon atom, at temperatures from 250° C. to 650° C., to the action of a catalyst comprising, initially, a mixture of easily-reducible and difficultly-reducible metal oxides and a metal halide.

14. In a process for the production of acetone, the improvement which comprises subjecting a mixture of ethyl alcohol and water vapors, at temperatures from 250° C. to 650° C., to the action of a catalyst comprising, initially, a mixture of easily-reducible and difficultly-reducible metal oxides and a metal halide.

15. In a process for the production of mixed ketones, the improvement which comprises subjecting a mixture of water vapor and the vapors of at least two alcohols containing more than one carbon atom, at temperatures from 250° C. to 650° C., to the action of a catalyst comprising, initially, a mixture of easily-reducible and difficultly-reducible metal oxides and a metal halide.

LLOYD C. SWALLEN.